May 3, 1960

K. L. MORTON

TEST SET FOR MEASURING SHUNT DELAY TIMES OF TELEPHONE DIALS 2,935,679

Filed Sept. 11, 1956

2 Sheets-Sheet 1

INVENTOR
K. L. MORTON
BY C. B. Hamilton
ATTORNEY

INVENTOR
K. L. MORTON
BY C. B. Hamilton
ATTORNEY

United States Patent Office 2,935,679
Patented May 3, 1960

2,935,679

TEST SET FOR MEASURING SHUNT DELAY TIMES OF TELEPHONE DIALS

Kenneth L. Morton, West Concord, Mass., assignor to Western Electric Company, Incorporated, New York, N.Y., a corporation of New York Application September 11, 1956, Serial No. 609,290

2 Claims. (Cl. 324—28)

This invention relates to testing circuits and more particularly to circuits for testing telephone dials.

One embodiment of a dial telephone is provided with a plurality of shunt contactors which are cammed to a closed position to shunt electrical components in a handset of the telephone when the dial is operated. When the dial returns to its normal position after being released, it operates a cam which automatically opens and closes a pulsing contactor to intermittently complete a pulsing circuit, the pulsing circuit being completed and broken a number of times equal to the digit dialed. Upon further rotation of the dial after the pulsing contactor is closed for the last time, the shunt contactors are opened. In the manufacture of dial telephones it is desirable to know the extent of rotation of the dial between the last closing of the pulsing contactor and the opening of the shunt contactors. This rotation may be determined by first determining the time interval between the last closing of the pulsing contactor and the opening of the shunt contactors, and by computing the amount of rotation from the known speed of rotation of the dial.

An object of this invention is to provide a circuit for determining the time interval between the operation of components of an article.

Another object of this invention is to provide a circuit having diode gates for connecting an oscillator to a pulse counter during the time interval between the operation of components of an article to measure this time interval.

One embodiment of the invention for determining the time interval between the last closing of a dial telephone pulsing contactor and the opening of a shunt contactor of the telephone may include an oscillator for applying pulses of known frequency through the closed shunt contactor to a closed diode gate. Upon the last closing of the pulsing contactor a network is actuated to operate a relay which closes a contactor to connect a negative voltage to the diode gate; whereby the gate opens and pulses from the oscillator pass through the gate to a pulse counter. When the telephone dial opens the shunt contactor the oscillator is disconnected from the counter and the time interval between the last closing of the pulsing contactor and the opening of the shunt contactor is represented by the number of pulses counted by the counter.

Other objects and advantages of the invention will become apparent by reference to the following detailed description and the accompanying drawings illustrating a preferred embodiment thereof, in which.

Figure 1:
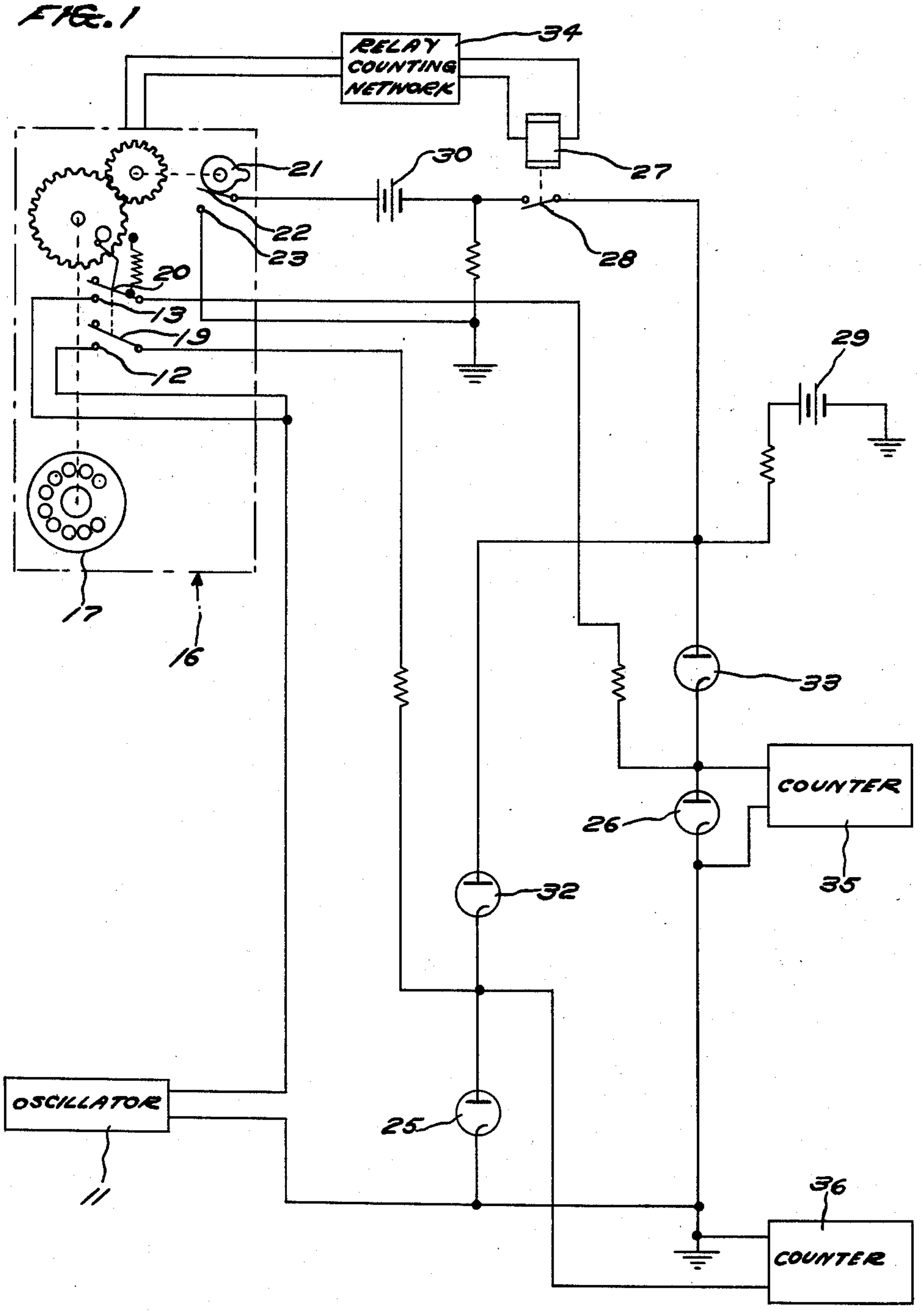
Fig. 1 is a schematic diagram illustrating one embodiment of the invention.

Referring now in detail to the drawings, an oscillator 11 is shown connected to contacts 12 and 13 of a telephone dial mechanism 16 of a well-known type to be tested. When a dial 17 of the telephone dial mechanism 16 is manually moved from its normal position, shunt contactors 19 and 20 are moved to engage contacts 12 and 13, respectively, to short electrical components mounted in a handset and base (not shown) of the telephone. When the dial 17 is released it returns to its normal position, and during this return movement actuates a cam 21 which moves a pulsing contactor 22 into and out of engagement with a contact 23.

During the time when the dial 17 is displaced from its normal position pulses from the oscillator 11 pass through the closed contactors 19 and 20 and are shorted by gating diodes 25 and 26 connected across the oscillator 11 and the shunt contactors 19 and 20. A positive terminal of a battery 29 is connected to bias diodes 32 and 33 as well as the diodes 25 and 26 to make them conductive. A relay counter network 34 of a well-known type receives a positive pulse from a battery 30 each time the pulsing contactor 22 disengages from the contact 23. The counter network 34 is preset to energize a relay 27 upon the last closing of the pulsing contactor 22, whereby a contactor 28 is closed to connect the negative terminal of the battery 30 to the diodes 32 and 33 to render them non-conductive.

Negative pulses from the oscillator 11 are no longer shorted through diodes 25 and 26 but are sent to electronic counters 35 and 36 of a well-known type which indicate the number of pulses received. Pulses from the oscillator 11 are thus sent to the counters 35 and 36 until the dial 17 opens the contactors 19 and 20 to disconnect the oscillator 11 from the counters 35 and 36. The counter 35 will then indicate the number of pulses received during the time interval between the last closing of the pulsing contactor 22 and the opening of the shunt contactor 19, and the counter 36 will indicate the number of pulses received during the time interval between the last closing of the pulsing contactor 22 and the opening of the shunt contactor 20.

Figure 2:
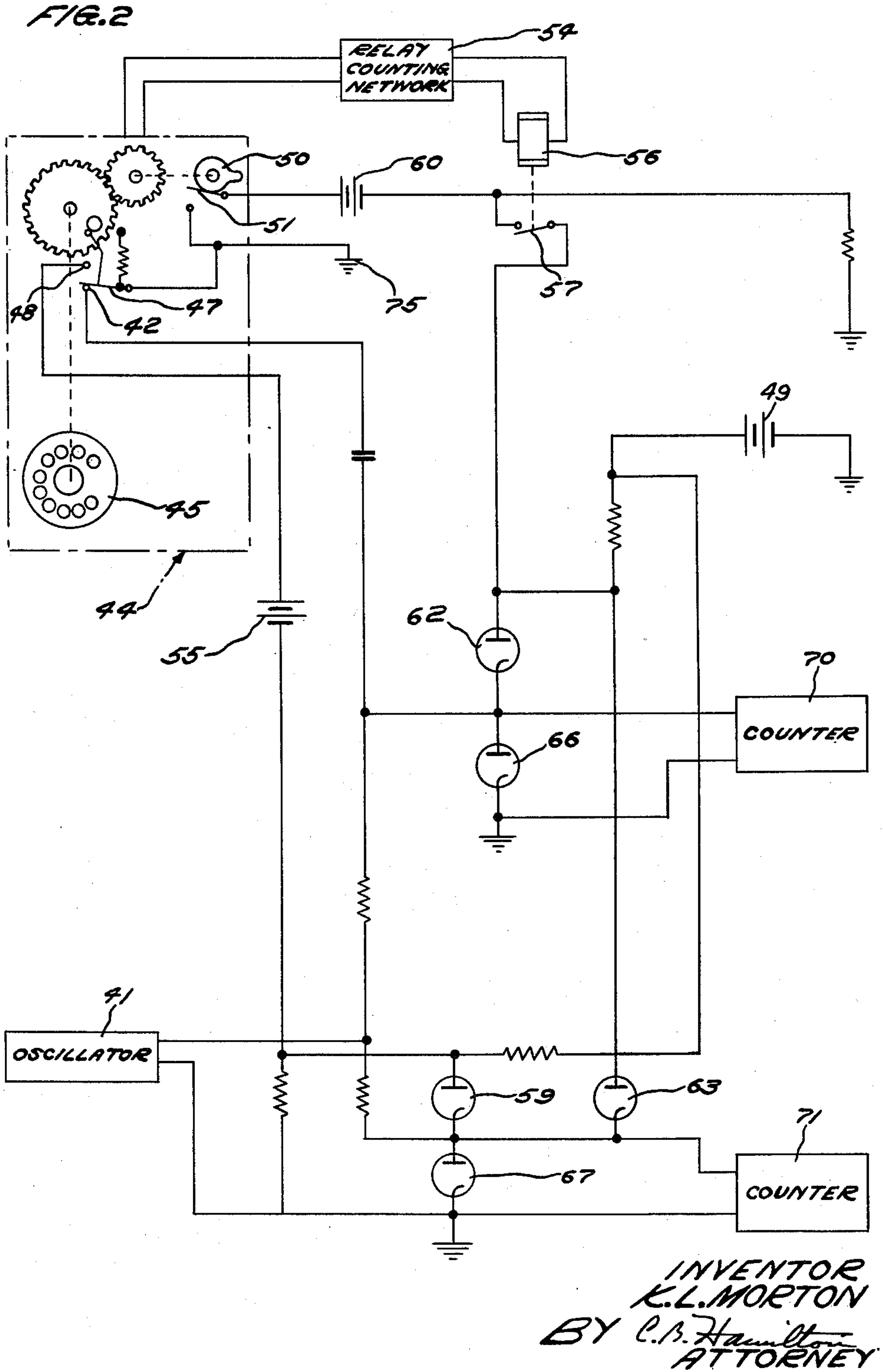
Fig. 2 is a schematic diagram of a second embodiment of the invention.

In the embodiment of the invention illustrated in Fig. 2, an oscillator 41 supplies pulses to a contact 42 of a telephone dial mechanism 44 of a well-known type to be tested. When a dial 45 of the telephone dial mechanism 44 is manually moved from its normal position, a contactor 47 is moved from engagement with the contact 42 into engagement with a contact 48, where it remains until the dial returns to its normal position. During the return movement of the dial 45 to its normal position it rotates a cam 50 to intermittently open and close a pulsing contactor 51. A battery 47 applies a positive voltage to diodes 62 and 66 which are connected in series and to diodes 59 and 63 which are connected in series with a diode 67. This causes the diodes 66 and 67 to conduct to short pulses from the oscillator 41 to render inoperative electronic pulse counters 70 and 71 of a well-known type.

A relay counter network 54 of a well-known type receives a positive pulse from a battery 60 each time the pulsing contactor 51 opens. The counter network 54 is preset to energize a relay 56 upon the last closing of the pulsing contactor 51. The relay 56 closes a contactor 57 to connect the negative terminal of the battery 60 to the diodes 62 and 63 to render them non-conductive. This renders the diodes 66 and 67 non-conductive to permit pulses from the oscillator 41 to pass to the counters 70 and 71. Pulses from the oscillator 41 are then sent to the counter 71 until the contactor 47 moves from engagement with the contact 48 to disconnect a voltage source 55 from the diode 59, which allows diodes 59 and 67 to conduct, shorting pulses from oscillator 41. Thus, the counter 71 receives pulses during the time interval between the last closing of the pulsing contactor 51 and the opening of contactor 47 and contact 48. Upon the closing of contactor 47 and contact 48, the oscillator 41 is connected to ground 75 to disconnect it from counter 70, whereby the counter 70 receives pulses from the oscillator 41 only during the interval between the last closing of the contactor 51 and the closing of contactor 47 and contact 42.

The pulses counted by the counter 71 will then represent the time interval between the last closing of the contactor 51 and the disengagement of contactor 47 and contact 48, and the pulses counted by the counter 70 will then represent the time interval between the closing of the contactor 51 and the engagement of contactor 47 and contact 42.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A system for determining the time interval between the last closing of a contactor which is opened and closed a predetermined number of times and the opening of a second contactor, said second contactor being opened after the first contactor has been opened and closed said predetermined number of times, comprising an oscillator connected to the second contactor for sending pulses of a known frequency therethrough, a gating diode connected across the second contactor and the oscillator for receiving pulses from the oscillator when the second contactor is closed, a pulse counter connected to the gating diode, means connected to the gating diode for rendering said diode conductive to shunt pulses from the oscillator to prevent said pulses from reaching the pulse counter, voltage supply means, and means connected to the first contactor for counting the openings and closings of the first contactor and for connecting the voltage supply means to the gating diode in response to said predetermined number of openings and closings of said first contactor, said voltage supply means rendering the gating diode nonconductive to cause pulses from the oscillator to pass to the pulse counter until the second contactor is opened.

2. A system for determining the time interval between the last closing of a first contactor which is opened and closed a predetermined number of times and the opening of a second contactor which is opened after the first contactor has been opened and closed said predetermined number of times, comprising an oscillator for sending pulses of a known frequency through the closed second contactor, a gating diode connected to the second contactor, a pulse counter connected to the gating diode for receiving and counting pulses sent through the second contactor, means connected to the gating diode for rendering said diode conductive to shunt pulses from the second contactor to prevent actuation of the counter, voltage supply means connected to the first contactor, a relay having a contactor closable for connecting the voltage supply means to the diode in such a way that said diode is rendered nonconductive to cause the pulses to pass to the counter, and a counting network connected to the first contactor for receiving a pulse from the voltage supply means each time said first contactor is closed and for energizing the relay in response to a predetermined number of pulses from the voltage supply means so as to connect said voltage supply means to the diode whereupon pulses from the oscillator are passed to the counter until the second contactor is opened, said predetermined number of pulses being equal to said predetermined number of times that the first contactor is opened and closed.

References Cited in the file of this patent

UNITED STATES PATENTS

| | | |
|---|---|---|
| 2,575,087 | Baker | Nov. 13, 1951 |
| 2,597,796 | Hindall | May 20, 1952 |
| 2,749,514 | Zaffarano | June 5, 1956 |